US010525793B2

(12) United States Patent
Käppner et al.

(10) Patent No.: US 10,525,793 B2
(45) Date of Patent: Jan. 7, 2020

(54) METHOD AND SYSTEM FOR TRANSMITTING HEAT FOR A VEHICLE

(71) Applicant: Volkswagen Aktiengesellschaft, Wolfsburg (DE)

(72) Inventors: Christoph Käppner, Braunschweig (DE); Jens Drückhammer, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 692 days.

(21) Appl. No.: 14/389,450

(22) PCT Filed: Mar. 18, 2013

(86) PCT No.: PCT/EP2013/055530
§ 371 (c)(1),
(2) Date: Sep. 30, 2014

(87) PCT Pub. No.: WO2013/143897
PCT Pub. Date: Oct. 3, 2013

(65) Prior Publication Data
US 2015/0060559 A1  Mar. 5, 2015

(30) Foreign Application Priority Data

Mar. 31, 2012  (DE) .......... 10 2012 006 632

(51) Int. Cl.
*B60H 1/02* (2006.01)
*F02G 5/02* (2006.01)
(Continued)

(52) U.S. Cl.
CPC ............ *B60H 1/02* (2013.01); *F01N 5/02* (2013.01); *F02G 5/02* (2013.01); *F28D 20/02* (2013.01);
(Continued)

(58) Field of Classification Search
CPC .......... B60H 1/02; B60H 1/025; F01M 5/001; F28D 2021/008
See application file for complete search history.

(56) References Cited

U.S. PATENT DOCUMENTS 3,450,770 A * 6/1969 Hatton ................. C07C 321/00
252/406
4,258,677 A * 3/1981 Sanders ................ F02N 19/10
123/142.5 R
(Continued)

FOREIGN PATENT DOCUMENTS

CN   101889136 A   11/2010
CN   102186711 A   9/2011
(Continued)

OTHER PUBLICATIONS

Google Patents, machine translation of JP2011240735A, retrieved Nov. 13, 2018.*
(Continued)

*Primary Examiner* — Avinash A Savani
*Assistant Examiner* — Deepak A Deean
(74) *Attorney, Agent, or Firm* — Pearl Cohen Zedek Latzer Baratz LLP

(57) ABSTRACT

A method and a system (20) for transmitting heat for a vehicle (10) are described. In this case, the waste heat which is contained in the exhaust gas (3) of the vehicle (10) is stored in a heat accumulator (1) of the vehicle (10). The thermal energy stored in the heat accumulator (1) is conducted to at least one heat sink (11-16). The heat accumulator (1) can be thermally coupled to the at least one heat sink (11-16) and uncoupled therefrom. In the coupled state the amount of heat per time unit that is conducted to the at least one heat sink is set.

15 Claims, 5 Drawing Sheets

(51) Int. Cl.
*F01N 5/02* (2006.01)
*F28D 21/00* (2006.01)
*F28D 20/02* (2006.01)
*F28F 27/02* (2006.01)
*F01M 5/00* (2006.01)

(52) U.S. Cl.
CPC .......... *F28D 21/0003* (2013.01); *F28F 27/02* (2013.01); *F01M 5/001* (2013.01); *F01N 2240/02* (2013.01); *F01N 2240/10* (2013.01); *F28D 2021/008* (2013.01); *Y02E 60/145* (2013.01); *Y02T 10/16* (2013.01); *Y02T 10/166* (2013.01)

(56) References Cited

U.S. PATENT DOCUMENTS

| | | | | |
|---|---|---|---|---|
| 5,101,801 A * | 4/1992 | Schatz | .................... | F02N 19/10 123/545 |
| 5,211,334 A * | 5/1993 | Schatz | ............... | B60H 1/00492 126/617 |
| 5,398,747 A * | 3/1995 | Miaoulis | ............ | B60H 1/00492 165/41 |
| 6,464,027 B1* | 10/2002 | Dage | ....................... | B60H 1/004 123/41.14 |
| 6,520,136 B2* | 2/2003 | Ito | ........................... | F02N 19/10 123/142.5 R |
| 6,708,653 B2* | 3/2004 | Lefrançois | ............. | F01P 11/029 123/41.54 |
| 7,368,196 B2* | 5/2008 | Wexel | .................... | H01M 8/04014 429/441 |
| 7,467,605 B2* | 12/2008 | Szalony | .................. | F01P 11/20 123/142.5 R |
| 7,621,262 B2* | 11/2009 | Zubeck | .................. | B60K 6/442 123/543 |
| 8,006,655 B2* | 8/2011 | Hiyama | ............. | B60H 1/00314 123/41.08 |
| 2002/0029755 A1* | 3/2002 | Ito | .......................... | F02N 19/10 123/142.5 R |
| 2009/0236435 A1* | 9/2009 | Kudo | ....................... | F01P 11/20 237/12.3 B |
| 2009/0241863 A1* | 10/2009 | Kimura | ................. | B60H 1/025 123/41.1 |
| 2010/0242452 A1 | 9/2010 | Kawazu et al. | | |
| 2011/0067389 A1* | 3/2011 | Prior | ...................... | B60H 1/025 60/320 |
| 2011/0088378 A1* | 4/2011 | Prior | ...................... | F01M 5/001 60/320 |
| 2011/0276210 A1* | 11/2011 | Tanaka | ................ | B60W 30/192 701/22 |
| 2012/0037148 A1* | 2/2012 | Tudor | .................... | F28D 20/02 126/400 |
| 2012/0152487 A1* | 6/2012 | Styles | ........................ | F01N 5/02 165/10 |
| 2013/0263574 A1* | 10/2013 | Levin | ........................ | F01N 5/02 60/273 |
| 2014/0047853 A1* | 2/2014 | Zhong | .................. | B60H 1/3201 62/106 |

FOREIGN PATENT DOCUMENTS

| | | |
|---|---|---|
| DE | 819334 A | 10/1951 |
| DE | 32 45 026 A1 | 6/1984 |
| DE | 197 01 134 A1 | 6/1998 |
| DE | 102 54 842 A1 | 6/2004 |
| DE | 20 2008 000 319 U1 | 4/2008 |
| DE | 10 2007 033 611 A1 | 1/2009 |
| DE | 10 2009 017 748 A1 | 10/2010 |
| DE | 10 2010 022962 A1 | 12/2011 |
| EP | 0 185 009 B1 | 6/1986 |
| EP | 0 888 913 A2 | 1/1999 |
| EP | 0 888 913 B1 | 3/2003 |
| EP | 1 359 312 A2 | 11/2003 |
| EP | 1 426 601 B1 | 6/2004 |
| EP | 1 267 050 B1 | 2/2005 |
| EP | 2 243 937 A1 | 10/2010 |
| EP | 2 392 500 A1 | 12/2011 |
| EP | 2 441 944 A2 | 4/2012 |
| JP | 2011 240735 A | 12/2011 |
| JP | 2012 122374 A | 6/2012 |
| WO | WO 1995/16175 A1 | 6/1995 |
| WO | WO 2010/109145 A2 | 9/2010 |

OTHER PUBLICATIONS

Office Action for Chinese Patent Application No. 201380017425.7, dated Nov. 4, 2015.
Supplemental Search Report for Chinese Patent Application No. 201380017425.7, dated Oct. 15, 2015.
International Search Report issued for PCT Patent Application No. PCT/EP2013/055530, dated Jul. 2, 2013.

* cited by examiner

METHOD AND SYSTEM FOR TRANSMITTING HEAT FOR A VEHICLE

CROSS-REFERENCE TO RELATED APPLICATIONS

This application is a National Phase Application of PCT International Application No. PCT/EP2013/055530, International Filing Date Mar. 18, 2013, claiming priority to German Patent Application No. 10 2012 006 632.5, filed Mar. 31, 2012, which is hereby incorporated by reference in its entirety.

FIELD OF THE INVENTION

The present invention relates to a method and to a system to systematically employ especially the waste heat of a vehicle in order to warm up certain areas of the vehicle.

German patent application DE 197 01 134 A1 describes a heat-storage element that is integrated into a passenger compartment ventilation system.

International patent document WO 95/16175 discloses a thermal-storage device in the air-distribution system of a vehicle. A phase-transition material for the storage of the heat is described here.

European patent specification EP 0 185 009 B1 discloses a capsule wall containing a heat-storing material as the heat-storage unit that serves to release the stored heat to an internal combustion engine.

Also in the case of modern vehicles, on the average, more than 70% of the energy contained in the fuel is lost to the environment as waste heat.

Before this backdrop, the objective of the present invention is to better utilize this energy that remains unused according to the state of the art.

According to the invention, this objective is achieved by a method for transmitting heat for a vehicle according to claim 1, by a system for transmitting heat for a vehicle according to claim 1 as well as by a vehicle according to claim 14. The dependent claims define preferred and advantageous embodiments of the present invention.

A method for transmitting heat for a vehicle is put forward within the scope of the present invention. In this context, the waste heat contained in the exhaust gas of the vehicle is stored in a heat-storage unit of the vehicle. The thermal energy stored in the heat-storage unit is then systematically conveyed to one or more heat sinks belonging to a group of heat sinks. For this purpose, the heat-storage unit can be thermally coupled to and uncoupled from the one or more heat sinks. In the coupled state (when the heat-storage unit is coupled to the one or more heat sinks), it is possible to select the amount of heat per unit of time that is conveyed to the appertaining heat sink. As a result, the thermal output that is made available can be precisely regulated for each heat sink individually.

The waste heat which, in the state of the art, would be released into the environment without being utilized, can now be stored in the heat-storage unit and subsequently transferred to the coolant water, to the transmission oil, to the motor oil, to the transmission, to the internal combustion engine, to the energy-storage device and/or to the charge air of the internal combustion engine, as a result of which the waste heat is advantageously employed in a more beneficial manner than is the case in the state of the art. In this process, the heating of the coolant water also allows the passenger compartment to be indirectly warmed up quickly since, for example, the air mass flow used for temperature control in the interior of the vehicle is warmed up in this manner. Preheating the charge air advantageously translates into a reduction of emissions in comparison to the case with cold charge air.

Therefore, the method according to the invention for transferring heat encompasses the following variants:
  conveying a heat flow from the heat-storage unit to one or more heat sinks.
  conveying a heat flow from a heat source (for instance, an exhaust-gas heat exchanger) to the heat-storage unit.
  conveying a heat flow from one or more heat sources to one or more heat sinks.

The predetermined value of the amount of heat per unit of time that is conveyed to a specific heat sink can be, on the average, 10 kW to 30 kW (e.g. 20 kW), whereby in the first seconds (e.g. 10 seconds) after the start of the heat flow, a maximum output of 40 kW to 50 kW is also possible. In order to attain a maximum consumption effect, the discharge of the heat-storage unit should be possible within less than 4 minutes (e.g. 3 minutes) after the engine has been started or the vehicle has started moving. In order to attain a maximum comfort effect, efforts should be aimed at a heat flow of 5 KW to 7 kW that is as constant as possible over the longest possible time span. In this context, this constant heat flow especially corresponds to the maximum output of the heat exchanger of the interior heating system of the vehicle.

The setting that specifies the amount of heat that is conveyed per unit of time to which heat sink is preferably laid down on the basis of test results. Moreover, it is possible to carry out this setting procedure on the basis of an optimization process. For this purpose, the thermal behavior of the vehicle is simulated and then, on the basis of certain criteria (lowest fuel consumption, greatest level of comfort in the passenger compartment, etc.) (all of which can optionally be prioritized by the driver), the best strategy is ascertained that then prescribes what the setting should be. In this process, as a rule, the entire heat flow (to all of the heat sinks) is initially (that is to say, at the beginning of the heat flow) limited by the heat-storage unit and then, over the further course, especially by the temperature regulation of the heat sinks (e.g. coolant, cooling water, transmission oil).

The group of heat sinks especially comprises the following elements:
  the coolant water of the vehicle;
  the oil for the transmission of the vehicle
  the motor oil of the internal combustion engine of the vehicle,
  the transmission of the vehicle
  the internal combustion engine of the vehicle,
  an energy-storage unit (for instance, a battery) of the vehicle,
  a fuel cell of the vehicle,
  one or more seats of the vehicle,
  an electric motor, particularly for the drive of the vehicle,
  an intercooler of the vehicle,
  one or more electronic components of the vehicle,
  a power control unit of the vehicle,
  the charge air of the internal combustion engine, and
  a heat sink that converts the conveyed amount of heat into another form of energy (for example, mechanical energy, electric energy) or into cold.

For example, a heat engine or a thermal-electric generator can be employed as the heat sink that converts the conveyed heat into another form of energy. Moreover, a heat sink (for instance, a sorption refrigeration system) can also use the amount of heat that is conveyed to it in order to generate cold that is then employed, for example, for purposes of air-conditioning or charge-air cooling.

The heat-storage unit can be used to smooth and stabilize the heat output conveyed to the appertaining heat sink, something that is particularly advantageous when a heat engine is employed as the heat sink.

In order to convey the thermal energy from the heat-storage unit to the heat sink(s), thermal oil that is chemically stable up to a temperature of 200° C. [392° F.] (preferably up to 250° C. [482° F.]) can be employed as a transfer medium. For example, 99%-ethanol or preferably 100%-ethanol can be used as the transfer medium or thermal oil.

The use of a transfer medium to transfer heat prevents, for instance, exhaust gas and coolant from flowing alternately or concurrently through the heat-storage unit. Moreover, the transfer medium, together with the heat-storage unit, makes it possible to implement an independent intermediate circuit that operates at a high temperature level (e.g. 250° C. [482° F.]). Since a thermal oil that is stable even at high temperatures is employed, it is hardly volatile, as a result of which it advantageously rarely needs to be topped up.

In a preferred embodiment according to the invention, the heat-storage unit is thermally coupled to the heat sink(s), and this thermal coupling takes place as a function of:
  the distance that the vehicle still has to travel and/or
  information about the circumstances involving the vehicle.

The use of predictive information regarding the distance and the circumstances involved (for example, the anticipated duration of the remainder of the trip, the load profile that can be directly anticipated for the vehicle, the ambient temperature in order to determine the heat demand in the passenger compartment), advantageously serves to control the thermal budget optimally.

For example, if the duration of the remainder of the trip is short (for instance, less than 3 km), less thermal energy is withdrawn from the heat-storage unit than in the case of a longer duration of the remainder of the trip. For short trips (e.g. total driving distance of less than 5 km), a larger portion of the thermal energy stored in the heat-storage unit is conveyed to the internal combustion engine (to the motor oil or directly to the internal combustion engine) than, for example, to the transmission. In contrast, if a peak performance of the vehicle is anticipated (for example, because of a hill in the route that the vehicle is about to travel), a larger portion of the thermal energy stored in the heat-storage unit is conveyed to the transmission than to the internal combustion engine. Here, in the two examples just mentioned, it is presupposed that neither the internal combustion engine nor the transmission has already reached its operating temperature.

In other words, as a function of the route that the vehicle is going to travel and of the information about the circumstances involved, the thermal coupling makes it possible to warm up specific areas of the vehicle that have not yet reached their operating temperature, so that especially the comfort (of the vehicle passengers), the wear and tear as well as the fuel consumption can all be optimized.

In particular, the heat-storage unit comprises a phase-transition material that serves to store the thermal energy.

The phase-transition material (especially on the basis of lithium salt) is employed as a latent-heat storage unit for purposes of storing thermodynamic energy by means of a phase transition (particularly from solid to liquid). In other words, the enthalpy of the reversible thermodynamic change in the state of the phase-transition material is used to store the appertaining thermodynamic energy. Subsequently, high-vacuum insulation of the heat-storage unit makes it possible to store the thermal energy overnight at low levels of loss.

A system for transmitting heat for a vehicle is also put forward within the scope of the present invention. In this context, the system comprises a heat-storage unit, one or more heat exchangers as well as one or more valves. On the one hand, the heat exchanger(s) is/are used to withdraw waste heat contained in the exhaust gas of the vehicle and to store it in the heat-storage unit. On the other hand, the heat-storage unit can be thermally coupled to and uncoupled from one or more heat sinks via one or more heat exchanger(s), as a result of which the thermal energy stored in the heat-storage unit is conveyed to the heat sink(s). By means of the valve(s), the system can precisely feed a predetermined amount of heat per unit of time to the heat sink in question.

The advantages of the system according to the invention essentially correspond to the advantages of the method according to the invention which have been elaborated upon in detail above, so that they will not be repeated at this juncture.

The valves that can be advantageously employed here are directional valves that have at least three connections so that, for example, a heat flow conveyed to the valve via a first connection or flow path can be diverted to a second or third connection or flow path. The use of a directional valve makes it possible to precisely meter which portion of the fluid stream conveyed to the directional valve is diverted to the second connection or flow path, whereby the remaining portion is diverted via the third connection or flow path. If the second connection is connected to the heat sink and if the third connection is connected to a bypass that circumvents the heat sink, the directional valve can be employed to very precisely meter the amount of heat per unit of time that is conveyed to the heat sink.

Moreover, the system according to the invention can comprise a piping network through which a transfer medium flows in order to thermally couple the heat-storage unit to the heat sink(s).

As already mentioned above, heat sink-heat exchangers can be employed to convey the thermal energy of the heat-storage unit to one or more heat sinks by means of the transfer medium.

Furthermore, the system can comprise one or more valves and can be configured in such a way that, by means of the valve(s), the flow volume of the transfer medium per unit of time from the heat-storage unit to the heat sink(s) can be appropriately set.

Thanks to the use of the valves, it is possible not only to decide whether the thermal energy is conveyed from the heat-storage unit to a specific heat sink, but also to set the amount of thermal energy per unit of time that is systematically transferred to that specific heat sink.

On the basis of an embodiment according to the invention, for each one or more of the at least one heat sink-heat exchanger, the piping network of the system can have a bypass path via which the transfer medium can circumvent the heat sink-heat exchanger in question. A valve can then be employed to set a first amount of the transfer medium per unit of time that flows through the appertaining heat sink-heat exchanger, as well as a second amount per unit of time that flows through the appertaining bypass path.

In other words, if the piping network comprises only one heat sink-heat exchanger, then, on the basis of the above-mentioned embodiment according to the invention, the piping network can have a bypass path for this heat sink-heat exchanger via which the transfer medium—controlled by a valve—can be made to bypass the heat sink-heat exchanger. Conversely, if the piping network comprises several heat sink-heat exchangers then, for example, only one of these heat sink-heat exchangers can have such a bypass path. In this case, however, it is also possible for only some of these several heat sink-heat exchangers or else for all of these several heat sink-heat exchangers to each have a bypass path that is controlled by a valve.

The implementation of bypass paths advantageously allows the piping network to establish a circulation of the transfer medium, without the transfer medium necessarily having to pass through each heat sink-heat exchanger.

Moreover, the system especially comprises a transfer-medium compensation tank that is coupled to the piping network. This transfer-medium compensation tank is configured in such a way that the pressure of the transfer medium in the piping network is kept constant.

Advantageously, the transfer-medium compensation tank can keep the pressure of the transfer medium constant within a wide temperature range, for instance, from −20° C. to 250° C. [−4° F. to 482° F.].

Finally, within the scope of the present invention, a vehicle is put forward that comprises a system according to the invention.

The driver influences the distribution of the heat flow from the heat-storage unit to the various heat sinks. In this context, a distinction can be made between the heat sinks that reduce the fuel consumption of the vehicle (e.g. motor oil, engine coolant, transmission oil) and the heat sinks that increase the comfort of the driver (and of other occupants) of the vehicle (e.g. engine coolant, sorption-cooling system, etc.—see below). By means of a (manual) prioritization (for instance, operating a heating and/or air-conditioning regulator), the heat flow can be distributed to the individual heat sinks in a stepless manner.

The heat flow can be advantageously distributed from the heat-storage unit to the various heat sinks that reduce the fuel consumption of the vehicle as a function of the engine operating point, the ambient temperature, the charged state of the heat-storage unit, the temperature of certain media (for example, the transfer medium, motor oil, transmission oil, engine coolant) as well as, if applicable, the route that has actually been driven and/or that is yet to be driven. The decision about the distribution of the heat flow or the determination of which amount of heat per unit of time is to be fed to which heat sink can be made or carried out on the basis of a pre-installed automatic state device, on the basis of neuronal networks, on the basis of a family of characteristics or on the basis of a constantly updated vehicle model that models the thermal behavior of the vehicle, in combination with the optimization method described above.

The system according to the invention encompasses the possibility of carrying out a (complete) heat transfer from the heat-storage unit into one or more heat sinks already before the internal combustion engine is started or before the drive is begun, whereby, in this case, preferably a coolant, especially an engine coolant, is warmed up. In this case, the system according to the invention is especially equipped to implement a coolant volume flow between the transfer medium-coolant-heat transfer means (e.g. cooling-water heat exchanger) and the internal combustion engine, even if the internal combustion engine is not running. For this purpose, for instance, an electric pump (e.g. a water pump) can be used in order to allow the coolant to circulate in the branch of the coolant circulation system between the transfer medium-coolant-heat transfer means and the internal combustion engine.

The heat transfer from the heat-storage unit into at least one heat sink is carried out before the internal combustion engine is started or before the drive has begun, for instance, if one or a combination of the following conditions is present:

the ignition has been activated.
the central locking system of the vehicle has been unlocked,
the driver's side door has been opened,
the system has received an appropriate signal from a remote control of the vehicle (similar to the case with a parking heater of the vehicle),
the system has received an appropriate SMS via a communication device of the vehicle,
the Internet has been used to specify a heat transfer starting time that is acquired by the system according to the invention via a communication means of the vehicle,
the onboard computer of the vehicle, for example, has been used to specify to the system a starting time for the heat transfer.

An undesired activation of the heat transfer before the internal combustion engine is started or before the drive has begun, and thus an undesired or premature discharging of the heat-storage unit, can be prevented in that certain of the above-mentioned conditions (especially the activation of the ignition, the unlocking of the central locking system and the opening of the driver's side door) only lead to activation of the heat transfer if one or more or all of the following preconditions have additionally been met:

the time span that has elapsed since the last deactivation of the internal combustion engine is greater than a prescribed time span (e.g. 1 hour),
the current engine temperature is lower than a prescribed engine temperature (e.g. 60° C. [140° F.]),
the current interior temperature is lower than a prescribed interior temperature (e.g. 20° C. [68° F.]),
the starting time for the heat transfer in terms of the day of the week and the time of day matches a utilization profile of the vehicle driver that has been learned by the system.

Each activation of the heat transfer that takes place more than 30 minutes before the actual beginning of the drive or the start of the internal combustion engine can be considered as an undesired activation of the heat transfer or as an erroneous triggering of the system. Taking the above-mentioned preconditions into consideration, for example, advantageously ensures that the activation according to the invention does not take place, for instance, if the central locking system is unlocked and the driver's side door is opened again within 10 minutes of the internal combustion engine having been turned off and the vehicle having been locked (for example, if a cellular phone was forgotten in the vehicle). In such a case, the system according to the invention recognizes that too short a time span has elapsed since the internal combustion engine was turned off or else that the internal combustion engine is still at its operating temperature, or that the presumed engine-starting time does not match the learned utilization profile, so that advantageously the heat transfer is not activated.

The present invention also advantageously reduces the fuel consumption of the vehicle since a heat deficit during the cold-start phase already at an engine-starting temperature of 20° C. [68° F.] translates into a higher consumption by 15% in the New European Driving Cycle (NEDC). This percentage value (15%) is very strongly dependent on the vehicle, especially on the drive engine of the vehicle, on the actual driving cycle as well as on other boundary conditions.

The present invention is particularly well-suited for motor vehicles. It goes without saying, however, that the present invention is not restricted to this preferred area of application since the present invention can also be employed for ships, aircraft as well as rail-mounted or track-guided vehicles. In addition, the invention itself is even suitable when it is not associated with a means of transportation, for example, in the case of stationary systems (e.g. a crane).

The invention will be explained in greater detail below on the basis of preferred embodiments according to the invention making reference to the figures.

Figure 1:
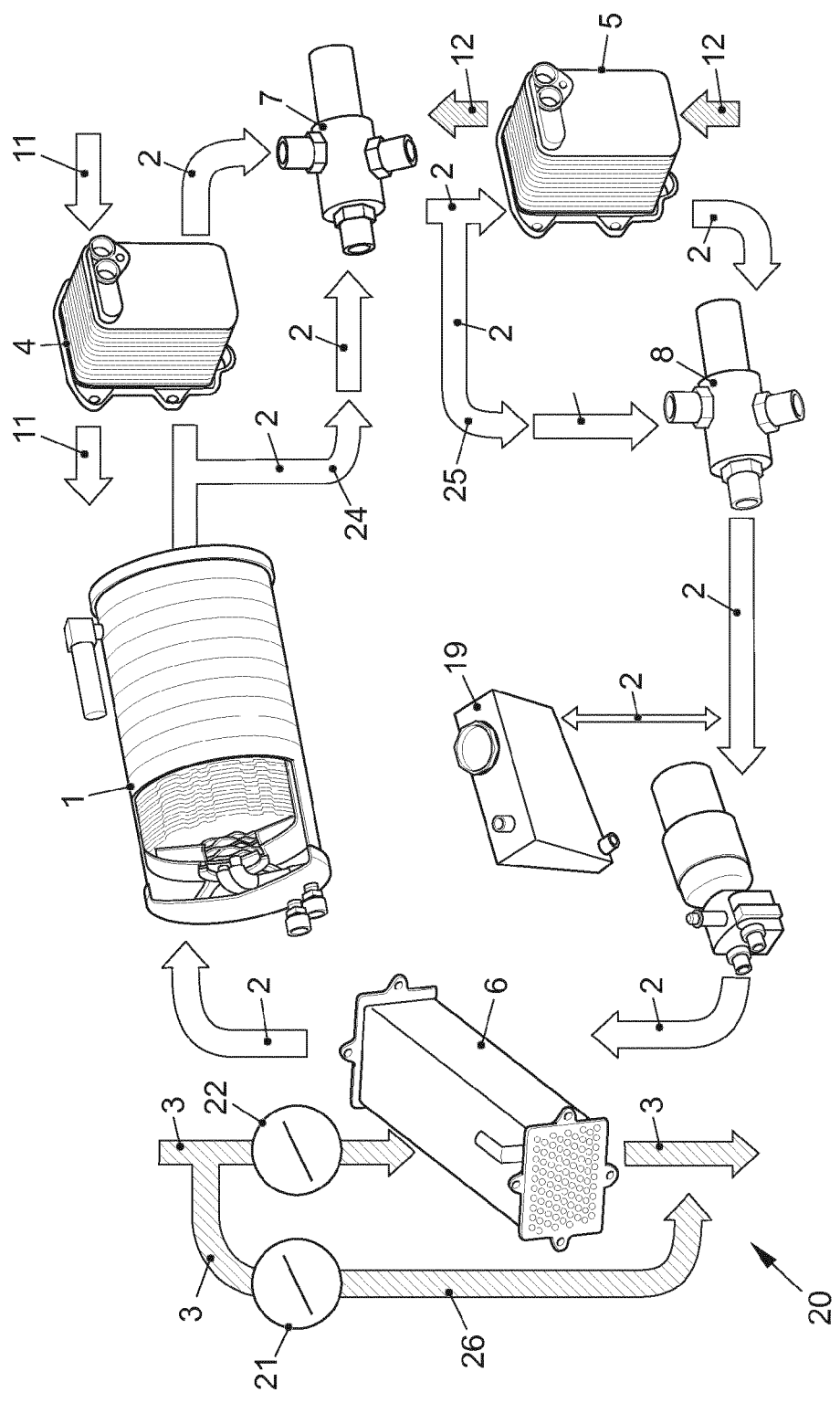
FIG. 1 shows a system according to the invention, having one exhaust-gas heat exchanger and two heat sink-heat exchangers as well as one bypass path per heat sink-heat exchanger.

FIG. 1 shows a system 20 according to the invention which comprises, aside from a heat-storage unit 1, also an exhaust-gas heat exchanger 6, a cooling-water heat exchanger 4 and a transmission-oil heat exchanger 5. The heat exchangers 4 to 6 are connected by a piping network through which a transfer medium or a thermal oil 2 flows. It can be seen that the thermal oil 2 circulates, a process in which it flows through the heat-storage unit 1, the cooling-water heat exchanger 4, the transmission-oil heat exchanger 5 and the exhaust-gas heat exchanger 6 in the direction of flow.

Whereas it is virtually unavoidable that the thermal oil 2 flows through the exhaust-gas heat exchanger 6, there is a bypass path 24, 25 for the coolant-water heat exchanger 4 and for the transmission oil-heat exchanger 5, respectively. The valve 7, which is arranged downstream from the coolant-water heat exchanger, can control the flow volume of the thermal oil 2 per unit of time through the coolant-water heat exchanger 4 relative to the flow volume of the thermal oil 2 per unit of time that is conveyed via the bypass path 24. By the same token, the valve 8, which is arranged downstream from the transmission-oil heat exchanger 5, can control the flow volume of the thermal oil 2 per unit of time through the transmission-oil heat exchanger 5 relative to the flow volume of the thermal oil 2 per unit of time that is conveyed via the bypass path 25. A thermal-oil compensation tank 19 can keep the pressure of the thermal oil in the piping network virtually constant. This compensation tank 19 is used because the volume of the thermal oil employed fluctuates by up to 25% between a temperature of −20° C. to 250° C. [−4° F. to 482° F.].

The valves 21 and 22 convey the exhaust gas 3 stemming from the internal combustion engine of the vehicle either through the exhaust-gas heat exchanger 6 or through the bypass path 26. In other words, the valves 21 and 22 can be employed to control the amount of heat from the exhaust gas 3 that is transferred to the thermal oil 2. The cooling water 11 of the internal combustion engine of the vehicle flows through the cooling-water heat exchanger 4, whereas the transmission oil 12 flows through the transmission-oil heat exchanger 5. Accordingly, the valves 7 and 8 can be employed to control how much thermal energy is transferred from the heat-storage unit 1 to the cooling water 11 and/or to the transmission oil 12.

In the case of a cold start of the vehicle (that is to say, neither the internal combustion engine nor the transmission are at the operating temperature), the valves 7 and 8 are switched in such a way that the thermal oil 2 flows through the cooling-water heat exchanger 4 as well as through the transmission-oil heat exchanger 5 so that the thermal energy made available by the heat-storage unit 1 is released to the cooling water 11 and to the transmission oil 12. In this manner, both the internal combustion engine and the transmission of the vehicle are warmed up, as a result of which the optimal operating temperature of the internal combustion engine as well as of the transmission is reached more quickly (than in the state of the art).

Figure 2:
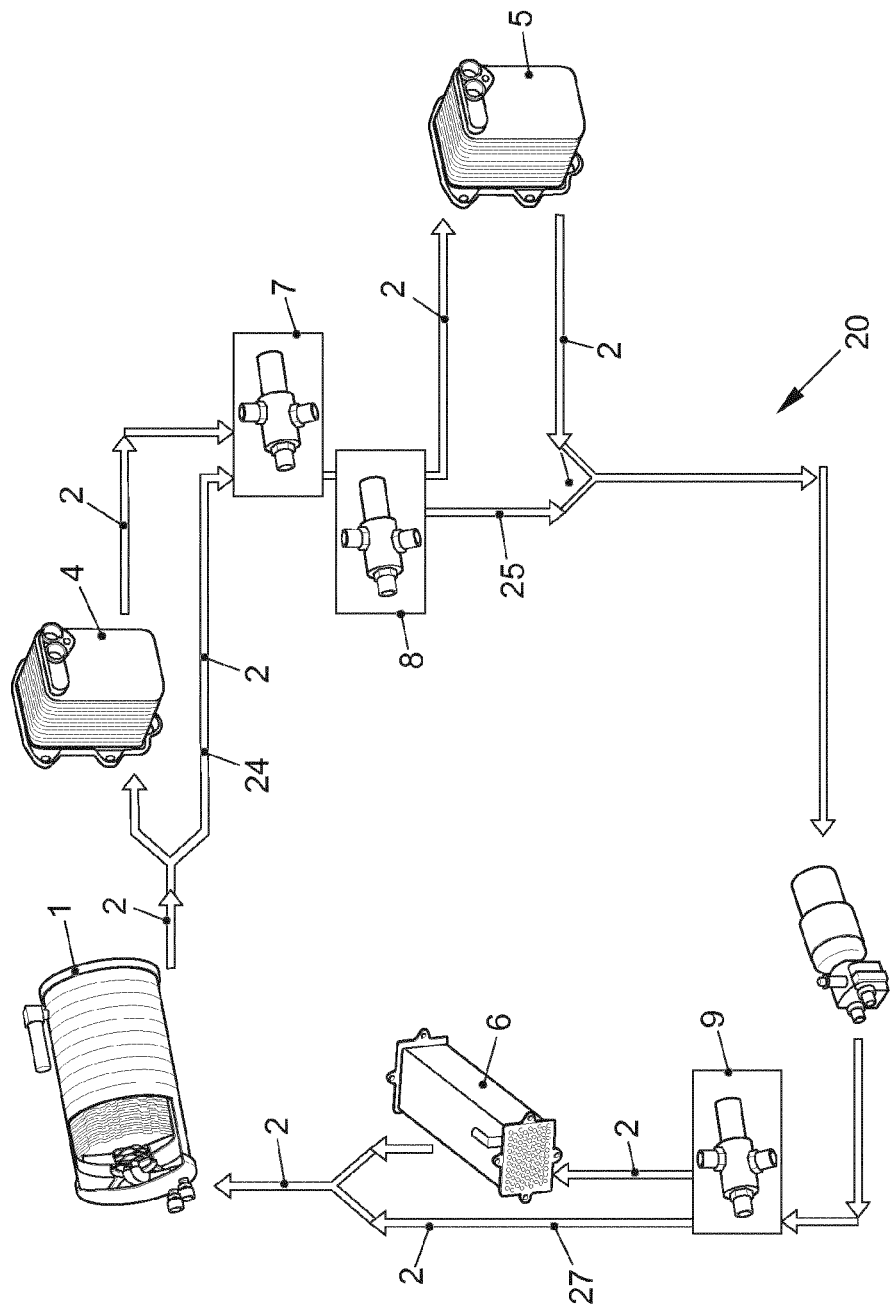
FIG. 2 shows another variant of a system according to the invention, having one exhaust-gas heat exchanger and two heat sink-heat exchangers as well as one bypass path per heat sink-heat exchanger.

FIG. 2 shows a variant of the system 20 according to the invention depicted in FIG. 1. For this reason, only the differences from the system 20 presented in FIG. 1 will be elaborated upon below.

The system shown in FIG. 2 also comprises a bypass path 27 of the thermal oil 2 for the exhaust-gas heat exchanger 6 whereby, upstream from the exhaust-gas heat exchanger 6, the valve 9 controls the flow volume of the thermal oil 2 per unit of time through the bypass path 27 relative to the flow volume of the thermal oil 2 per unit of time through the exhaust-gas heat exchanger 6. In contrast to the system 20 shown in FIG. 1, here, the valve 8—which serves to set the flow volume of the thermal oil 2 through the bypass path 25 relative to the flow volume of the thermal oil 2 conveyed through the transmission-oil heat exchanger 5—is situated upstream from transmission-oil heat exchanger 5. As a result, instead of the 3/2-way valves 7 and 8 (three connections and two possible directions) shown in FIG. 2, here it also is possible to employ a 4/4-way valve (four connections and four possible directions).

Figure 3:
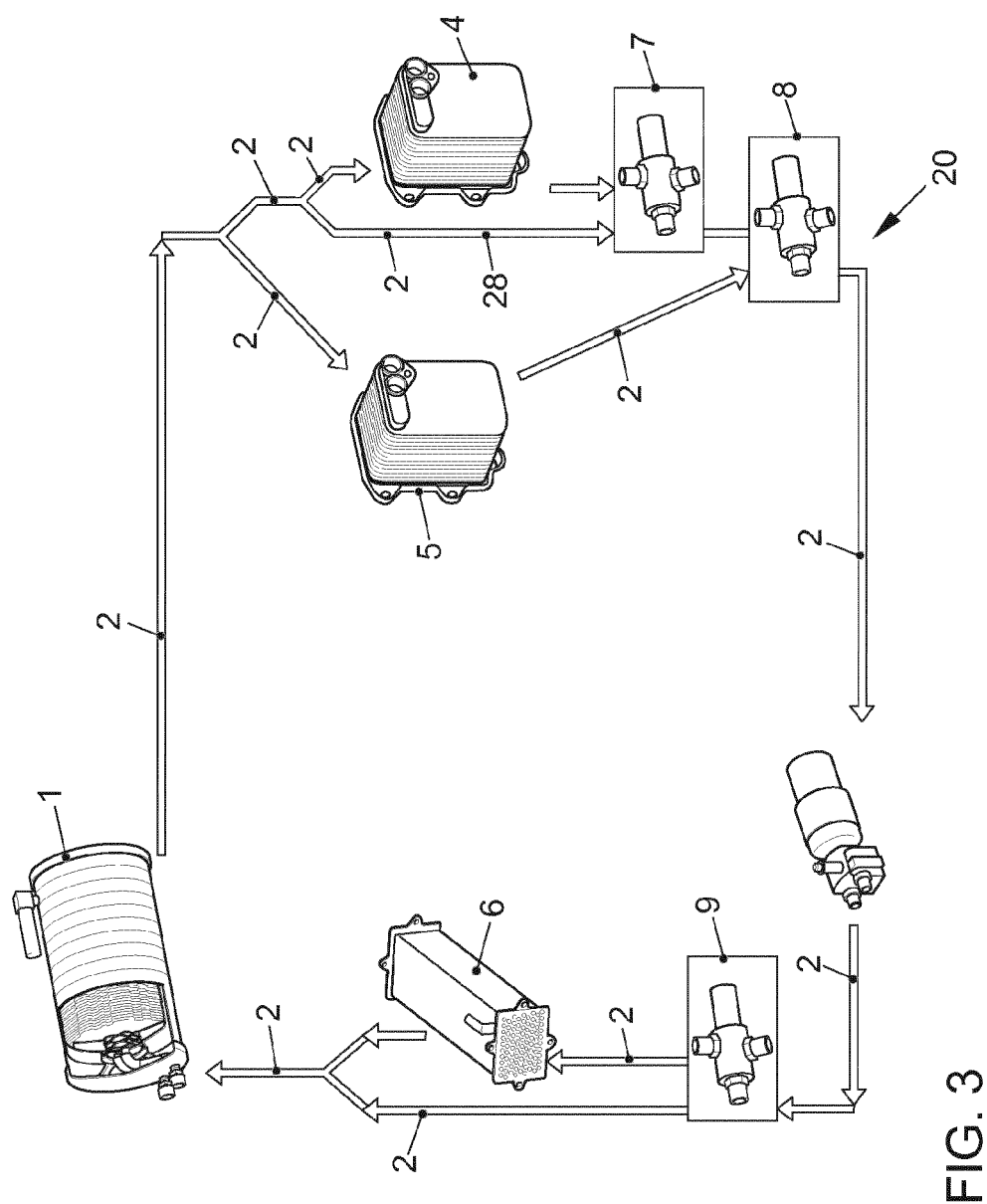
FIG. 3 shows a system according to the invention, having one exhaust-gas heat exchanger and two heat sink-heat exchangers, whereby the two heat sink-heat exchangers have a shared bypass path.

FIG. 3 shows another variant of the system 20 according to the invention depicted in FIGS. 1 and 2. The differences from the system 20 shown in FIG. 2 will be explained below.

Whereas the system 20 shown in FIG. 2 has a bypass path 24, 25 for the coolant-water heat exchanger 4 and for the transmission oil-heat exchanger 5, respectively, in the system shown in FIG. 3, the flow path through the coolant-water heat exchanger 4, the flow path through the transmission-oil heat exchanger 5 and the bypass path 28 are parallel to each other. Here, the valve 8 can be used to set the flow volume per unit of time through the transmission-oil heat exchanger 5 relative to the flow volume per unit of time through the bypass path 28 and/or through the cooling-water heat exchanger 4. Moreover, the valve 7 can also be used to set the flow volume per unit of time through the bypass path 28 relative to the flow volume per unit of time through the cooling-water heat exchanger 4.

Figure 4:
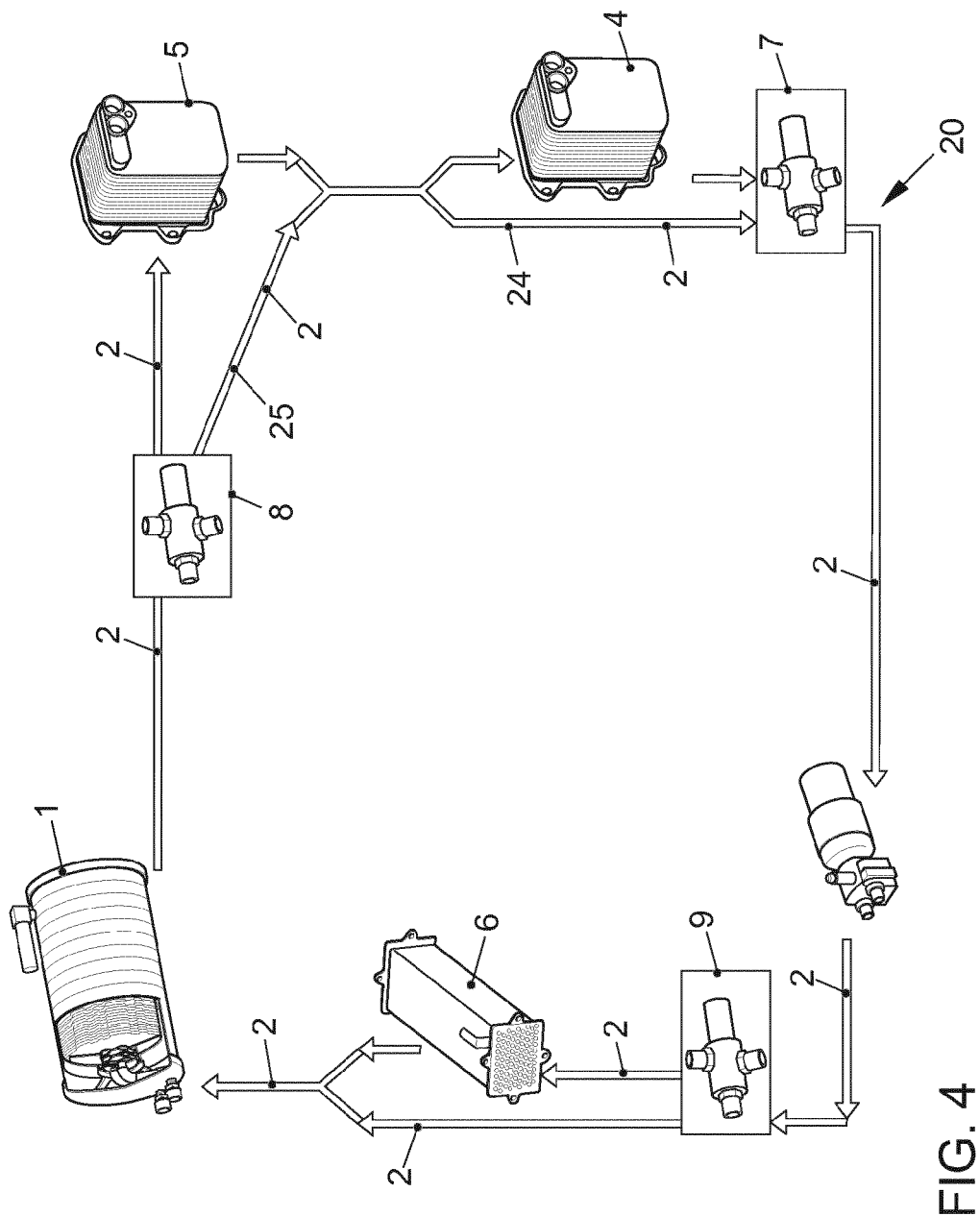
FIG. 4 shows another variant of a system according to the invention, having one exhaust-gas heat exchanger and two heat sink-heat exchangers as well as one bypass path per heat sink-heat exchanger.

FIG. 4 shows yet another variant of the system 20 according to the invention depicted in FIGS. 1 to 3. The differences from the system 20 shown in FIG. 2 will be elucidated below.

Whereas in the system 20 shown in FIG. 2, first the cooling-water heat exchanger 4 and then the transmission-oil heat exchanger 5 are arranged downstream from the heat-storage unit 1, in the system 20 shown in FIG. 4, first the transmission-oil heat exchanger 5 and then the cooling-water heat exchanger 4 are arranged downstream from the heat-storage unit 1.

The valves 7 to 9 are especially configured in such a way that, when they are currentless (that is to say, when they are not receiving any control commands from a control device), the valves 7 to 9 switch to a prescribed path. In this context, it has proven to be advantageous for the valves 7 to 9 to convey the thermal oil 2 through the bypass path when they are currentless.

Figure 5:
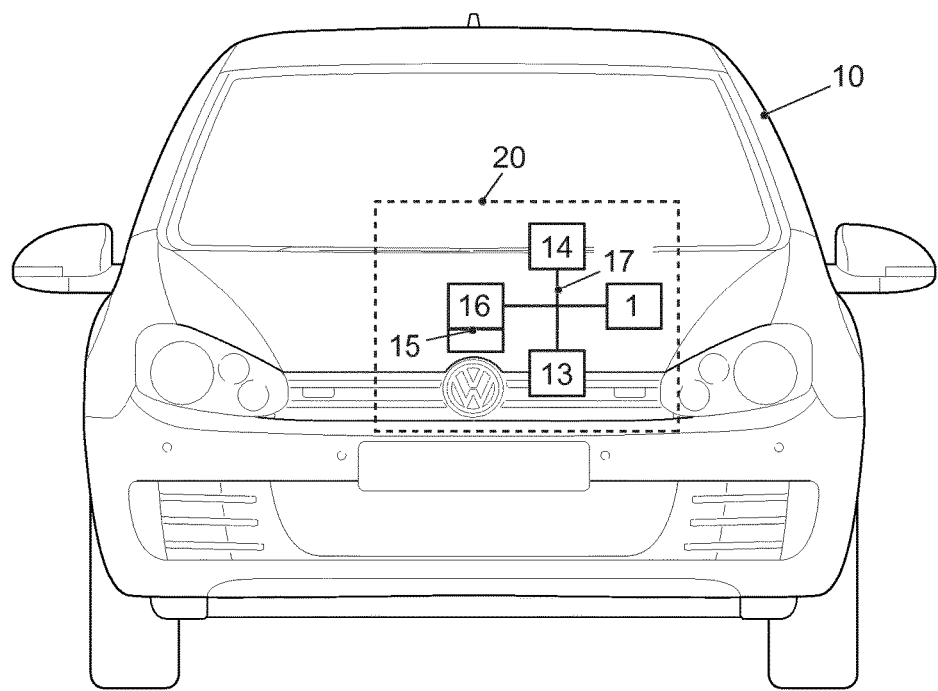
FIG. 5 shows a schematic view of a vehicle according to the invention, having a system according to the invention.

Finally, FIG. 5 shows a vehicle 10 according to the invention, comprising a system 20 according to the invention. Here, the schematically depicted system 20 has a piping network 17 by means of which the heat-storage unit 1 can be thermally coupled to and uncoupled from the heat sinks, namely, the battery 13, the transmission 14 and the internal combustion engine 16 of the vehicle 10. The motor oil 15 is present in the internal combustion engine 16.

LIST OF REFERENCE NUMERALS 1 heat-storage unit
2 thermal oil
3 exhaust gas
4 cooling-water heat exchanger
5 transmission-oil heat exchanger
6 exhaust-gas heat exchanger
7 valve
8 valve
9 valve
10 vehicle
11 cooling water
12 transmission oil
13 battery
14 transmission
15 motor oil
16 internal combustion engine
17 piping network
19 thermal-oil compensation tank
20 system
21, 22 valve
24 to 28 bypass

The invention claimed is:

1. A system for transferring heat in a vehicle, the system comprising:
    a heat-storage unit configured to store waste heat contained in exhaust gas of the vehicle, wherein the exhaust gas is thereafter released into the environment, and wherein the heat-storage unit comprises a phase transition material employed as a latent-heat storage unit for storing thermal energy via a phase transition of the phase-transition material from solid to liquid,
    at least one heat exchanger configured to convey the waste heat to the heat-storage unit,
    at least one heat sink,
    at least one valve configured to:
        thermally couple the heat-storage unit to the at least one heat sink such that thermal energy stored in the heat-storage unit is conveyed to the at least one heat sink,
        thermally uncouple the heat-storage unit from the at least one heat sink, and
        set a predetermined value for an amount of heat per unit of time that is conveyed to the at least one heat sink,
    a piping network through which a transfer medium circulates in order to thermally couple the heat-storage unit to the at least one heat sink, wherein the piping network connects the heat-storage unit, the at least one heat exchanger, and at least two other heat exchangers in series, whereas the at least two other heat exchangers are connected by the piping network with respect to each other in series or in parallel,
    wherein the at least two other heat exchangers are a cooling-water heat exchanger and a transmission oil heat exchanger,
    wherein cooling water of the internal combustion engine flows through the cooling-water heat exchanger, and transmission oil flows through the transmission oil heat exchanger, and
    wherein the transfer medium is a thermal oil which is:
        configured to be chemically stable up to a temperature of 200° C.; and
        is not the cooling water or the transmission oil.

2. The system according to claim 1, wherein the system comprises a piping network through which a transfer medium flows in order to thermally couple the heat-storage unit to the at least one heat sink.

3. The system according to claim 2,
    wherein the at least one heat exchanger comprises at least one heat sink-heat exchanger and
    wherein the at least one heat sink-heat exchanger is configured to release the thermal energy from the heat-storage unit to the at least one heat sink by means of the transfer medium.

4. The system according to claim 3,
    wherein, for each one or more of the at least one heat sink-heat exchanger, the piping network has a bypass path via which the transfer medium can bypass an appertaining heat sink-heat exchanger, and
    wherein the system is configured such that the at least one valve can be employed to set a first portion of the transfer medium that flows through the appertaining heat sink-heat exchanger, as well as a second portion that flows through an appertaining bypass path.

5. The system according to claim 2,
    wherein the system comprises a transfer-medium compensation tank that is connected to the piping network, such that the transfer-medium compensation tank is configured to keep the pressure of the transfer medium in the piping network constant.

6. The system according to claim 1, wherein the system is configured to carry out a method comprising the following steps:
    storing, in a heat-storage unit of the vehicle, waste heat contained in exhaust gas of the vehicle, wherein the waste heat is heat which would have been released into the environment without being utilized,
    conveying thermal energy stored in the heat-storage unit to at least one heat sink, whereby the heat-storage unit is configured to be thermally coupled to and uncoupled from the at least one heat sink, whereby, in the coupled state, the amount of heat per unit of time that is conveyed to the at least one heat sink is set to a predetermined value.

7. The system according to claim 1, wherein the piping network includes a bypass for each of the at least two other heat exchangers.

8. The system according to claim 1,
    wherein, if the at least two other heat exchangers are connected by the piping network with respect to each other in series, the piping network includes different bypasses for the at least two other heat exchangers, or wherein, if the at least two other heat exchangers are connected by the piping network with respect to each other in parallel, the piping network includes a same bypass for the at least two other heat exchangers.

9. The system according to claim 1, wherein the piping network includes a transfer medium-bypass for the at least one heat exchanger.

10. The system according to claim 1, wherein the piping network includes an exhaust gas-bypass for the at least one heat exchanger.

11. The system according to claim 1, wherein the phase-transition material comprises lithium salt.

12. The system according to claim 1, wherein, the heat-storage unit is located between the at least one heat exchanger and the at least two other heat exchangers, in a direction which the transfer medium circulates through the piping network.

13. A vehicle having a system according to claim 1.

14. A system for transferring heat in a vehicle, the system comprising:
- a heat-storage unit configured to store waste heat contained in exhaust gas of the vehicle, wherein the exhaust gas is thereafter released into the environment,
- at least one heat exchanger configured to convey the waste heat to the heat-storage unit,
- at least one heat sink, and
- at least one valve configured to:
  - thermally couple the heat-storage unit to the at least one heat sink such that thermal energy stored in the heat-storage unit is conveyed to the at least one heat sink,
  - thermally uncouple the heat-storage unit from the at least one heat sink, and
  - set a predetermined value for an amount of heat per unit of time that is conveyed to the at least one heat sink,
- a piping network through which a transfer medium circulates in order to thermally couple the heat-storage unit to the at least one heat sink, wherein the piping network connects the heat-storage unit, the at least one heat exchanger, and at least two other heat exchangers in series, whereas the at least two other heat exchangers are connected by the piping network with respect to each other in series or in parallel, wherein the at least two other heat exchangers area cooling-water heat exchanger and a transmission oil heat exchanger, and wherein cooling water of the internal combustion engine flows through the cooling-water heat exchanger, and transmission oil flows through the transmission oil heat exchanger, and wherein the transfer medium is a thermal oil which is:
- configured to be chemically stable up to a temperature of 200° C.; and
- not the cooling water or the transmission oil.

15. The system according to claim 14, wherein the heat-storage unit comprises a phase-transition material which is employed as a latent-heat storage unit for storing thermal energy via a phase transition of the phase-transition material from solid to liquid.

* * * * *